No. 850,622. PATENTED APR. 16, 1907.
G. W. CLARK.
EQUALIZING AND DISTRIBUTING FITTING.
APPLICATION FILED SEPT. 12, 1903.

2 SHEETS—SHEET 1.

WITNESSES:
Geo. D. Richards
F. H. W. Fraentzel

INVENTOR:
George W. Clark,
BY
Fred H. Fraentzel,
ATTORNEY

No. 850,622. PATENTED APR. 16, 1907.
G. W. CLARK.
EQUALIZING AND DISTRIBUTING FITTING.
APPLICATION FILED SEPT. 12, 1903.
2 SHEETS—SHEET 2.
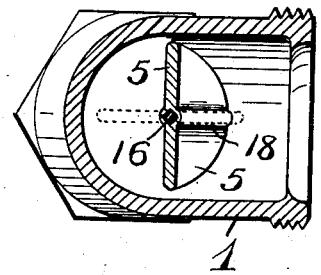
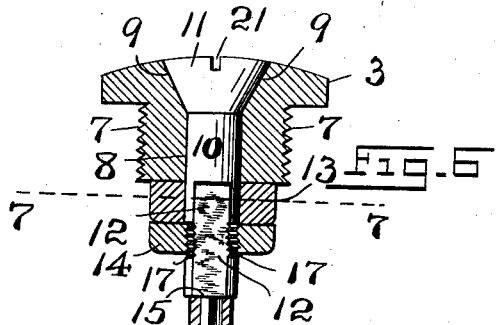
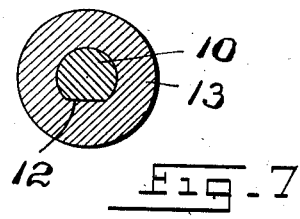
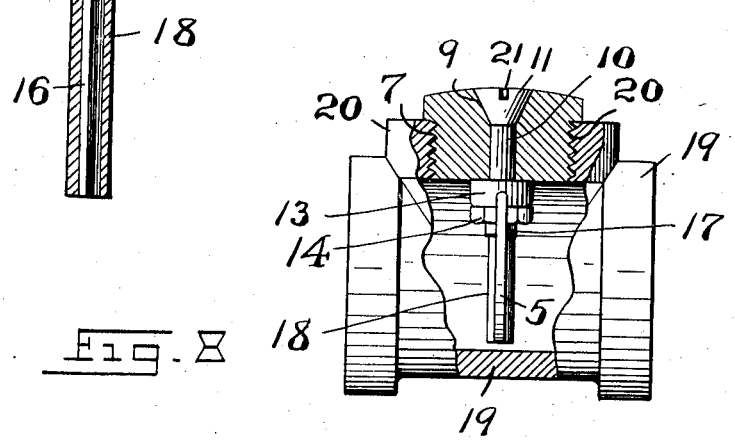
WITNESSES:
INVENTOR:
George W. Clark,
BY
Fred L. C. Fraentzel
ATTORNEY.

UNITED STATES PATENT OFFICE.

GEORGE W. CLARK, OF NEW YORK, N. Y.

EQUALIZING AND DISTRIBUTING FITTING.

No. 850,622.    Specification of Letters Patent.    Patented April 16, 1907.

Application filed September 12, 1903. Serial No. 172,885.

*To all whom it may concern:*

Be it known that I, GEORGE W. CLARK, a citizen of the United States, residing at New York, in the county of New York and State of New York, have invented certain new and useful Improvements in Equalizing and Distributing Fittings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference to improvements in fittings to be arranged in the return-pipes used with radiators, such fittings being in the form of elbows, T-fittings, or other similar fittings and being provided with an adjustable retarding means or baffle for preventing more or less the flow of a liquid through a pipe; and the principal object of the invention is to provide a suitable fitting, such as an elbow or T-fitting or other fitting, with a retarding means or baffle which can be set at any desired angle to the direction of the flow of the fluid within the fitting for the purpose of retarding or accelerating the flow of hot water or other fluid therethrough according to the degree of the angle at which the baffle of the fitting is set.

Other objects of this invention not at this time more particularly specified will be evident from the following detailed description of my present invention.

My present invention consists, therefore, in the novel retarding fitting or device hereinafter set forth; and the invention consists, furthermore, in the various arrangements and combinations of parts, all of which will be hereinafter more fully described and then finally embodied in the clauses of the claim which form an essential part of and are appended to this specification.

The invention is clearly illustrated in the accompanying drawings, in which—

Figures 1, 2:
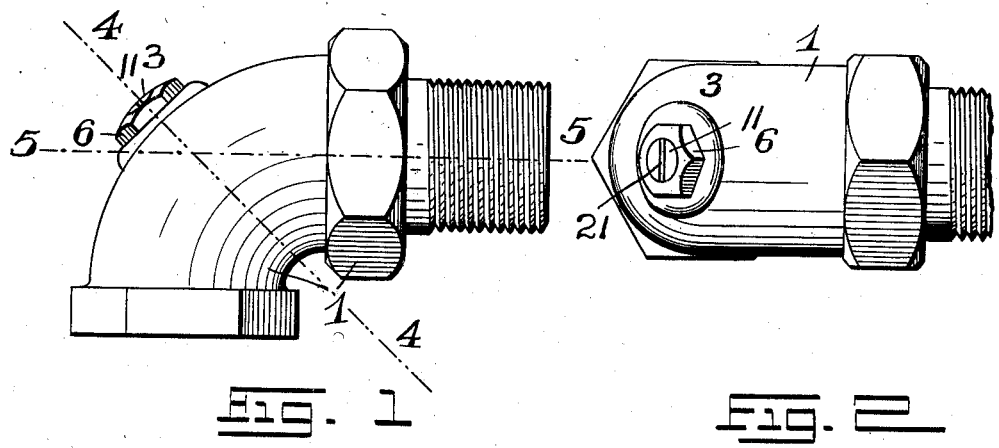
Figures 3, 4:
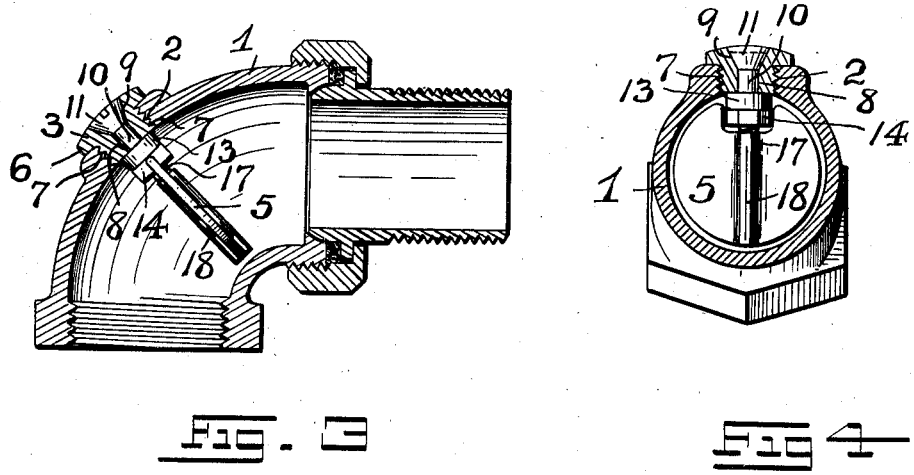

Figures 1 and 2 are a side elevation and top view, respectively, of an elbow provided with an equalizing and distributing means or baffle embodying the principles of this invention. Fig. 3 is a longitudinal vertical section of the same, and Fig. 4 is a transverse section taken on line 4 4 in Fig. 1 of the drawings. Fig. 5 is a horizontal section of the device, taken on line 5 5 in said Fig. 1. Fig. 6 is a longitudinal vertical section, on an enlarged scale, of the retarding device in its detached relation from the elbow or other fitting, said view indicating also in dotted outline a second position of the retarding plate or baffle of the device in a plane at right angles to the plane in which said plate or baffle is shown in section, and Fig. 7 is a horizontal section taken on line 7 7 in said Fig. 6. Fig. 8 is a view of a T-fitting for mains or direct piping, a portion of the said fitting being represented as being broken away and illustrating in connection therewith the retarding means or baffle embodying the features of the present invention.

Similar characters of reference are employed in all of the above-described views to indicate corresponding parts.

In the said drawings the reference character 1 indicates any suitable fitting, such as an elbow, as represented in Figs. 1 to 5, inclusive, and which is to be arranged in the return-pipes employed more especially with hot-water radiators and the connecting-pipe system. This fitting is made with an opening 2, preferably screw-threaded, as illustrated in Figs. 3 and 4 of the drawings, in which is arranged, by means of a screw-plug 3 or other similar device, a spindle or stem and plate or disk 5 to be presently more particularly described. This plug 3 is made with a nut or other suitably-shaped portion 6 and has the screw portion 7, by means of which it is securely fixed in the said screw-threaded opening 2 of the elbow, as shown. The said plug 3 is also made with a tubular portion 8 and a ground cone-shaped seat 9.

The spindle or stem previously mentioned is provided with the body portion 10, which is rotatively fitted in the said tubular portion 8 of the plug 3 and is capable of a rotative movement in said portion 8, the said body portion 10 having a cone-shaped end or head 11, which can be snugly fitted upon the cone-shaped seat 9, as illustrated in the several figures of the drawings. A part of the body portion 10 of the stem or spindle may be flattened, as at 12, (see Figs. 6 and 7,) a washer 13 being arranged upon this portion and being held in place by means of a lock-nut 14, arranged upon the lower screw-threaded end portion 17 of the said stem or spindle, as clearly illustrated. Below this nut 14 the stem or spindle is made with a shoulder 15 and the reduced stem portion 16, and secured against this shoulder 15 and upon said stem portion 16 in any manner is the tubular or other receiving member 18 of a suitable disk or plate 5 of any suitable marginal configuration, according to the interior of the casing of the fitting with which it is to be used. One arrangement of said disk or plate 5 upon the stem or spindle is more particularly illustrated in Figs. 3, 4, and 5, the circular or other suitably-formed face of said disk or plate 5 being made of smaller diameter than the inner diameter of the fitting 1, so that there will at all times be a circulation of the fluid through the fitting, which is essential, especially in hot-water heating systems. That the said plate or disk 5 can be set at any angle across the interior of the fitting the nut 14 and washer 15 are arranged upon the stem 10 in such a manner that the lock-nut will have a frictional hold upon the under surface of the washer and allows for a rotative motion of the stem by means of a screw-driver or other similar means being placed in a slot or groove 21, extending across the cone-shaped head 11 of said stem, the frictional engagement between the parts being such that when the disk has been turned into its angular position it is held stationary irrespective of the flow of the liquid against the same.

My present form of liquid-retarding fitting or baffle is especially adapted for use with radiators in hot-water heating systems, the device being efficiently employed for retarding the flow of hot water through the pipes, and hence causing the distribution of the hot water much slower from the radiators located nearest the supply of the hot water than would otherwise be the case, thereby preventing some radiators heating up more rapidly than others. All the radiators in the system will therefore be equally supplied and will be uniformly heated.

This form of liquid-retarding device or baffle can also be used in other fittings, as in T-fittings, as indicated in Fig. 8 of the drawings, such fittings being used in the mains or systems of piping. One form of fitting of this character is indicated in said Fig. 8 by the reference character 19, the screw-plug 3 or other suitable plug and its parts, as above described, being arranged in a screw-threaded or other suitable receiving portion 20 and the disk or plate 5 being located directly within the main part of said fitting 19, as shown in said Fig. 8.

I claim—

1. A fitting for pipes for preventing more or less the flow of a liquid through the pipe, comprising a shell having an opening, a plug in said opening having a tubular portion and a cone-seat, a stem rotatively arranged in said tubular portion of said plug, said stem having a cone-shaped head arranged on said cone-seat, said stem being provided with a flattened part, a washer on said flattened part, a lock-nut on said stem, and a disk or baffle-plate on the lower end portion of said stem for retarding the flow of a liquid through said fitting, substantially as and for the purposes set forth.

2. A fitting for pipes for preventing more or less the flow of a liquid through the pipe, comprising a shell having an opening, a plug in said opening having a tubular portion and a cone-seat, a stem rotatively arranged in said tubular portion of said plug, said stem having a cone-shaped head arranged on said cone-seat, said stem being provided with a flattened part, a washer on said flattened part, a lock-nut on said stem, a disk or baffle-plate on the lower end portion of said stem for retarding the flow of a liquid through said fitting, said cone-shaped head of the stem being provided with a slot for setting said disk or plate at different angles across the interior of the fitting, substantially as and for the purposes set forth.

In testimony that I claim the invention set forth above I have hereunto set my hand this 8th day of September, 1903.

GEORGE W. CLARK.

Witnesses:
FREDK. C. FRAENTZEL,
GEORGE D. RICHARDS.